United States Patent
Watanabe et al.

(10) Patent No.: US 9,357,702 B2
(45) Date of Patent: Jun. 7, 2016

(54) ENGINE-POWERED WORK TOOL PROVIDED WITH STAND

(71) Applicant: HITACHI KOKI CO., LTD., Tokyo (JP)

(72) Inventors: Hideki Watanabe, Hitachinaka (JP); Naoki Tsuruoka, Chiba-ken (JP); Masayoshi Goto, Chiba-ken (JP); Takeshi Matsuoka, Hitachinaka (JP); Hiroyuki Hasegawa, Hitachinaka (JP); Norihide Tao, Hitachinaka (JP)

(73) Assignee: Hitachi Koki Co., Ltd., Tokyo (JP)

(*) Notice: Subject to any disclaimer, the term of this patent is extended or adjusted under 35 U.S.C. 154(b) by 36 days.

(21) Appl. No.: 14/459,053

(22) Filed: Aug. 13, 2014

(65) Prior Publication Data

US 2015/0047210 A1 Feb. 19, 2015

(30) Foreign Application Priority Data

Aug. 19, 2013 (JP) ................. 2013-169865

(51) Int. Cl.
| | |
|---|---|
| A01D 34/40 | (2006.01) |
| A01D 34/416 | (2006.01) |
| A01D 34/90 | (2006.01) |
| A01D 34/82 | (2006.01) |
| F02B 63/02 | (2006.01) |

(52) U.S. Cl.
CPC ............ *A01D 34/90* (2013.01); *A01D 34/4167* (2013.01); *A01D 34/82* (2013.01); *F02B 63/02* (2013.01)

(58) Field of Classification Search
CPC ... A01D 34/4167; A01D 34/82; A01D 34/90; F02B 63/02; F02D 9/02; F02D 2009/0203; F02D 2009/021; F01P 5/02
USPC ............ 30/275.4, 276, 296.1, 322, 312, 347, 30/177.4; 123/41.65, 185.3, 2, 263, 262; 220/4.41, 4.14; 224/261, 263, 210, 224/212; 56/12.7, 245; D8/8, 61; 242/378, 242/378.1, 388, 388.1
See application file for complete search history.

(56) References Cited

U.S. PATENT DOCUMENTS

| | | | | |
|---|---|---|---|---|
| 6,378,468 | B1* | 4/2002 | Kouchi | F02B 63/04 123/195 C |
| 7,007,660 | B2* | 3/2006 | Taomo | B01D 46/0004 123/198 E |
| 2006/0248731 | A1* | 11/2006 | Suzuki | A01D 34/90 30/276 |

(Continued)

FOREIGN PATENT DOCUMENTS

JP 2009-197770 A 9/2009

*Primary Examiner* — Ghassem Alie
(74) *Attorney, Agent, or Firm* — Kilpatrick Townsend & Stockton LLP

(57) ABSTRACT

An engine-powered work tool includes: a shaft extending in a first direction; an engine at a rear end portion of the shaft; a fuel tank disposed below the engine in a second direction perpendicular to the first direction; and a stand fixed to the engine. The stand includes a fastening portion fixed to a front end portion of the engine, and a curved portion extending from the fastening portion and curving toward a rear end portion of the engine. The curved portion provides a lower end portion positioned downstream of a bottom end portion of the fuel tank in the second direction. The lower end portion has a distal end positioned upstream of the rear end portion of the fuel tank in the first direction, the distal end and the bottom end of the fuel tank defining a gap therebetween in the second direction.

11 Claims, 8 Drawing Sheets

(56) References Cited

U.S. PATENT DOCUMENTS

| | | | |
|---|---|---|---|
| 2010/0095925 A1* | 4/2010 | Sotiriades | B60K 15/067 123/198 R |
| 2012/0011730 A1* | 1/2012 | Nakamura | F01P 5/06 30/277.4 |
| 2014/0216370 A1* | 8/2014 | Ichihashi | F01N 3/046 123/41.65 |

* cited by examiner

ENGINE-POWERED WORK TOOL PROVIDED WITH STAND

CROSS REFERENCE TO RELATED APPLICATION

This application claims priority from Japanese Patent Application No. 2013-169865 filed Aug. 19, 2013, the entire content of which is incorporated herein by reference.

TECHNICAL FIELD

The present invention relates to a work tool provided with a compact engine, such as a brush cutter.

BACKGROUND

An engine-powered brush cutter for cutting or trimming hedges and the like is well-known. Such a conventional brush cutter includes: an engine; a shaft having a rear end provided with the engine; and a rotary cutting blade provided at a front end of the shaft. An operator can move the cutting blade to a desired position, while holding the shaft of the brush cutter. Generally, such structure is effective in performing cutting work for the operator even if a relatively heavy engine is employed as a power source for the brush cutter.

In the brush cutter, a fuel tank is also provided below the engine at the rear end of the shaft for storing fuel for the engine. In general, the fuel tank and its tank cap are provided below the engine in order to prevent fuel from adhering to an ignition plug provided in the engine or wirings connected to the ignition plug.

Such fuel tank may be made of a translucent resin material, so that the operator can visually confirm a remaining amount of fuel in the fuel tank (an oil level). However, the fuel tank made of a translucent and oil-resistant lightweight plastic material is relatively weak in terms of mechanical strength.

Referring to FIGS. 8A and 8B, Japanese Patent Application No. 2009-197770 discloses a brush cutter 310 whose rear end portion (drive section 330) is provided with an engine 340, a fuel tank 360 and a protective cover (stand) 350 for covering a lower portion of the fuel tank 360. The protective cover 350 is fixed to the engine 340 and the fuel tank 360 by a plurality of bolts. The protective cover 350 is made of a resin material and is designed to support the brush cutter 310 when the brush cutter 310 is placed on the ground.

When the brush cutter 310 is placed on the ground as illustrated in FIG. 8A, an antiscattering cover 314 (near a cutting blade 311) and the protective cover 350 are in contact with the ground. The protective cover 350 covers the lower portion of the fuel tank 360 in the front-rear direction and a starter 341 provided rearward of the fuel tank 360. Thus, when the brush cutter 310 is placed on the ground, the protective cover 350 can be brought into contact with the ground, thereby supporting the brush cutter 310 placed on the ground, preventing contact of the fuel tank 360 against the ground, and protecting the starter 341. In this brush cutter 310, if the area covered by the protective cover 350 is enlarged and a thickness of the protective cover 350 is increased, the protective cover 350 may provide enhanced protective performance over the fuel tank 360 and reliable support to the brush cutter 310.

FIG. 8C shows a stand 450 as an alternative to the protective cover (stand) 350 for supporting a rear end portion (drive section 430) of the brush cutter 310. The stand 450 has a simpler configuration than the protective cover (stand) 350. The stand 450 extends downward from a front end portion of the engine 340 and has a distal end positioned lower than the fuel tank 360. Since the stand 450 does not cover the lower portion of the fuel tank 360, the stand 450 provides a reduced protective performance when compared to the protective cover 350. However, the stand 450 having such simple structure can still provide mechanical support to the brush cutter 310, with a smaller weight than the protective cover (stand) 350.

SUMMARY

Increase in the area covering the lower portion of the fuel tank 360 results in increase in size and weight of the protective cover 350 as a whole. Further, a large number of bolts are required (for example, four bolts (two at the front, and two at the rear) are necessary in total) for fixing the enlarged protective cover 350 to the engine 340 and fuel tank 360. Such large number of bolts significantly increases the weight of the brush cutter 310 at its rear end portion. In view of the need for the operator to operate a shaft 320 extending between the cutting blade 311 and engine 340 to move the cutting blade 311 to a desired position, such enlarged protective cover 350 may render it difficult for the operator to perform cutting work due to the increased weight at the rear end portion (drive section 330) of the brush cutter 310.

The compact stand 450 could be free from such problems, since the stand 450 covers a limited area of the fuel tank 360 and has a sole function to support the brush cutter 310 placed on the ground. However, the stand 450 may not have enough mechanical strength or may not have enough fixation strength relative to the drive section 430. As a result, reliability of the stand 450 would be degraded and increased protective performance of the stand 450 relative to the fuel tank 360 could not be obtained.

In view of the foregoing, it is an object of the present invention to provide an engine-powered work tool provided with a stand capable of providing an enhanced reliability when placed on the ground while mitigating burden for an operator during cutting work.

In order to attain the above and other objects, there is provided an engine-powered work tool including a shaft, an engine, a fuel tank and a stand. The shaft extends in a first direction and has a rear end portion and a front end portion opposite to each other in the first direction, the first direction being defined as a direction from the front end portion toward the rear end portion. The engine is provided at the rear end portion of the shaft and is configured to generate a drive force, the drive force being configured to be transmitted from the engine toward the front end portion of the shaft, the engine having a front end portion and a rear end portion opposite to each other in the first direction. The fuel tank is configured to store fuel to be supplied to the engine and is disposed below the engine in a second direction perpendicular to the first direction, the second direction being defined as a direction from the engine to the fuel tank, the fuel tank having a rear end portion positioned most downstream in the fuel tank in the first direction and a bottom end portion positioned most downstream in the fuel tank in the second direction. The stand is fixed to the engine and extends toward downstream in the second direction to have a lower end portion positioned downstream of the bottom end portion of the fuel tank in the second direction. The stand includes: a fastening portion fixed to the front end portion of the engine; and a curved portion extending from the fastening portion and curving toward the rear end portion of the engine, the curved portion providing the lower end portion, the lower end portion having a distal end positioned upstream of the rear end portion of the fuel tank in the first direction, the distal end and the bottom end of the fuel tank defining a gap therebetween in the second direction.

Preferably, the stand is also fixed to the fuel tank.

Preferably, the stand is fixed to the engine only at the fastening portion.

Preferably, the fastening portion is fixed to the front end potion of the engine from a downstream side thereof in the second direction. Alternatively, it is also preferable that the fastening portion is fixed to the front end potion of the engine from an upstream side thereof in the first direction.

Preferably, the curved portion includes a cutout portion recessed from the distal end in a direction opposite to the first direction.

Preferably, the fuel tank is made of a material that permits the fuel to be visually confirmed from outside.

Preferably, the engine-powered work tool further includes a rotary blade provided at the front end portion of the shaft and configured to rotate upon receipt of the drive force from the engine to constitute a brush cutter.

DETAILED DESCRIPTION

A configuration of a brush cutter 10 as an example of an engine-powered work tool according to an embodiment of the present invention will be described with reference to FIGS. 1A to 4.

Figure 1A:
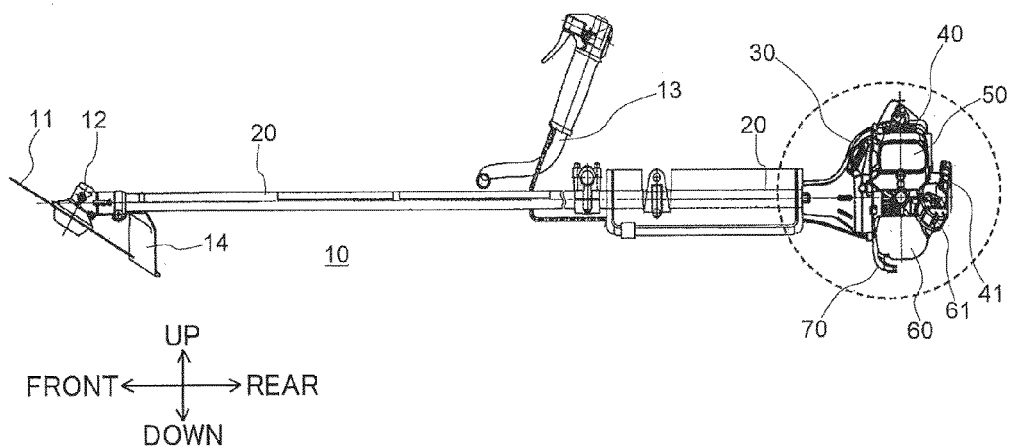
FIG. 1A is a side view illustrating a brush cutter according to an embodiment of the present invention.

In the following description, directions used in relation to the brush cutter 10 will be referred to assuming that the brush cutter 10 is placed on the ground as shown in FIG. 1A. Specifically, hereinafter, left and right sides in FIG. 1A will be referred to as "front side" and "rear side" of the brush cutter 10 respectively, and the vertical direction in FIG. 1A will be referred to as "up-down direction" or "vertical direction" of the brush cutter 10.

Figure 1B:
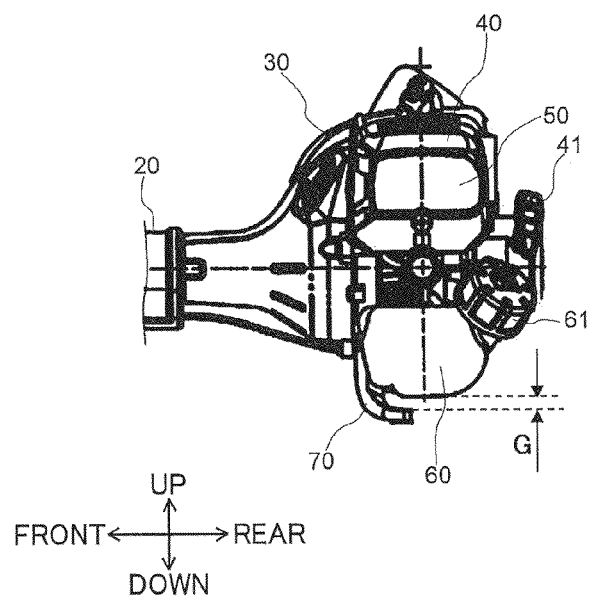
FIG. 1B is an enlarged side view of a rear end portion of the brush cutter according to the embodiment, the brush cutter including a stand.

As show in FIGS. 1A and 1B, the brush cutter 10 includes a shaft 20 extending in a front-rear direction (corresponding to a first direction), a cutting blade 11 provided on a front end portion of the shaft 20, a drive section 30 provided at a rear end portion of the shaft 20. In the specification, the first direction is defined as a direction from the cutting blade 11 toward the drive section 30.

The drive section 30 accommodates an engine 40 therein for driving (rotating) the cutting blade 11. The engine 40 is a compact two-cycle air-cooled engine and is used as a power source of the drive section 30. A drive shaft (not shown) is coaxially disposed within the shaft 20 and is connected to a crankshaft 42 of the engine 40 (see FIG. 2) through a centrifugal clutch (not shown). When a rotation speed of the crankshaft 42 increases and the centrifugal clutch is connected to the drive shaft, the drive shaft starts to rotate upon receipt of a drive force from the engine 40. This rotation of the drive shaft is transmitted to a gear case 12 provided at the front end portion of the shaft 20 near the cutting blade 11 to rotate the cutting blade 11 at an appropriate speed reduction ratio. Handles 13 for gripping by an operator are provided at respective left and right sides near a center of the shaft 20 in the front-rear direction. Further, an antiscattering cover 14 is provided below the cutting blade 11 for preventing cut grass and braches from being scattered toward the operator.

Figure 2:
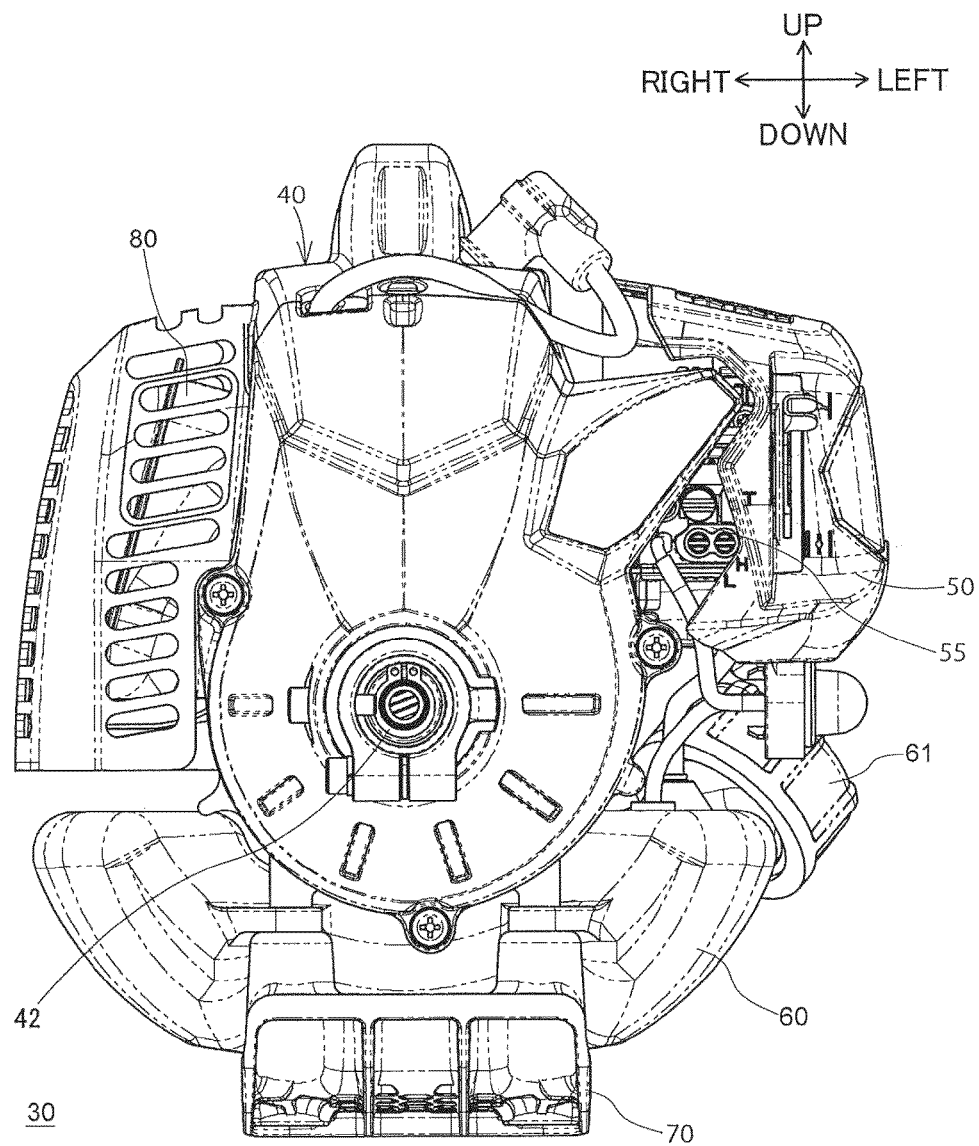
FIG. 2 is a front view of the rear end portion of the brush cutter.

The drive section 30 includes the engine 40, a fuel tank 60 and a stand 70. Specifically, a suction port (not shown) is provided to the left of the engine 40 (near side in FIG. 1A), and an exhaust port (not shown) is provided to the right of the engine 40 (far side in FIG. 1A). Referring to FIG. 2, a carburetor 55 and an air cleaner 50 are provided near the suction port on the left side, and a muffler 80 is provided near the exhaust port on the right side. Further, a starter (recoil starter) 41 is provided to the rear of the engine 40 to forcibly rotate the crankshaft for staring the engine 40 (see FIGS. 1A and 1B).

The fuel tank 60 is fixedly disposed below the engine 40 for storing fuel therefor. Here, a direction from the engine 40 toward the fuel tank 60 (parallel to the up-down direction) is defined as a second direction in the specification. A cap 61 is provided on the fuel tank 60 for enabling the operator to supply fuel into the fuel tank 60. While the fuel (mixed gasoline) is supplied from the fuel tank 60 to the carburetor 55, air is also introduced into the carburetor 55 through the air cleaner 50. Thus an air-fuel mixture is generated in the carburetor 55 and supplied to the engine 40.

The stand 70 is provided at a front end portion of the engine 40 to extend downward therefrom. The stand 70 is made from a resin material.

Specifically, the stand 70 is fixed to the front end portion of the engine 40, extends therefrom downward in the up-down direction (the second direction), and is then gradually curved rearward up to a position below and near a lowermost end portion of the fuel tank 60 (the lowermost end portion is a portion positioned most downstream in the fuel tank 60 in the second direction and corresponds to a bottom end portion). That is, the stand 70 has a distal end (rear end portion or lower end portion) positioned frontward than a rear end portion of the fuel tank 60 (the rear end portion of the fuel tank 60 is a portion positioned most downstream in the fuel tank 60 in the first direction). In other words, the distal end of the stand 70 is positioned upstream of the rear end portion of the fuel tank 60 in the front-rear direction. Accordingly, the stand 70 covers only a front half of a lower portion of the fuel tank 60 but does not cover a rear half thereof. The distal end of the stand 70 and the lowermost end portion of the fuel tank 60 define a gap G therebeween in the vertical direction (second direction) as shown in FIG. 1B. The gap G is set such that the stand 70 and fuel tank 60 do not contact each other even if the stand 70 deforms due to application of a load thereto.

Figure 3A:
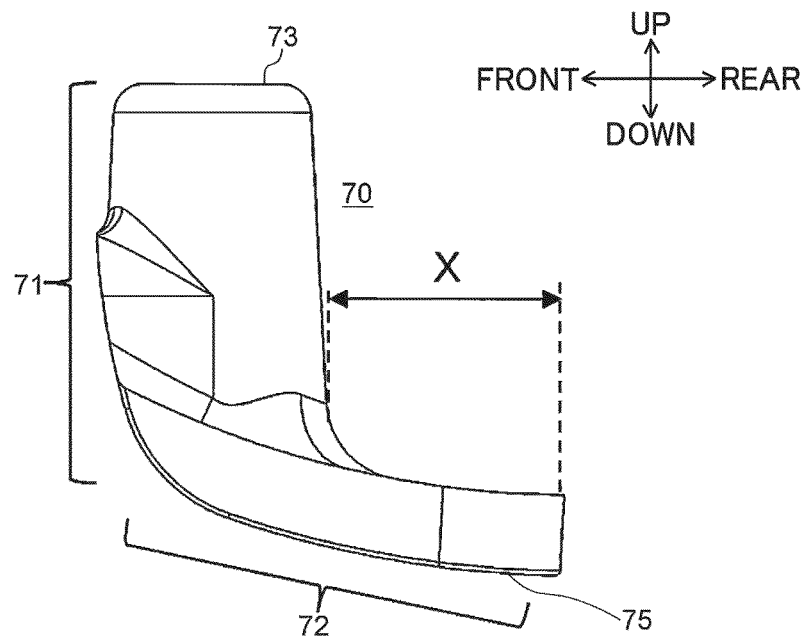
FIG. 3A is a side view of the stand used in the brush cutter according to the embodiment.
Figure 3B:
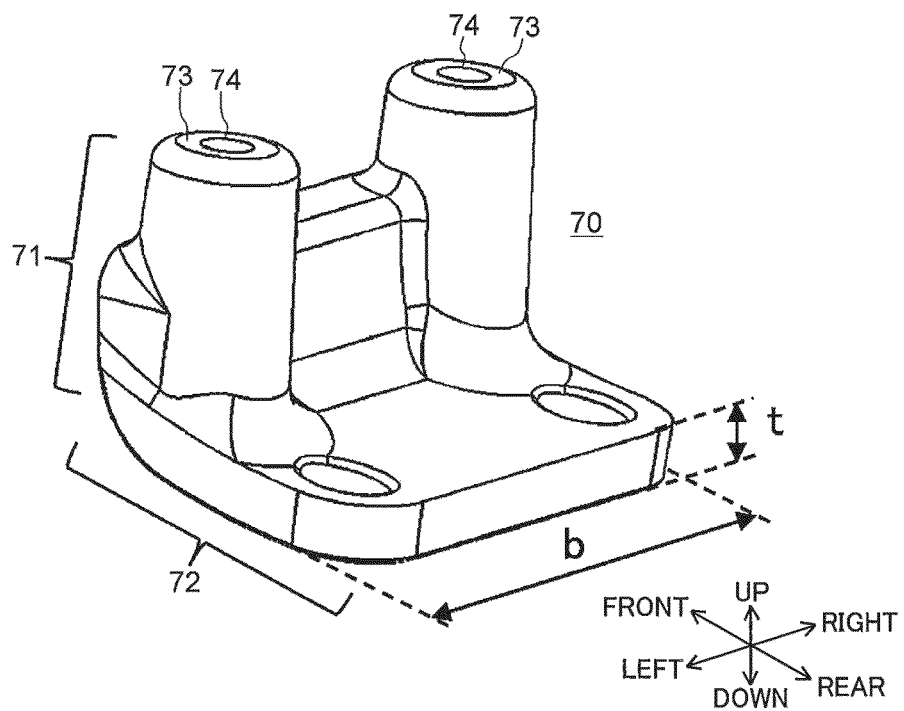
FIG. 3B is a perspective view of the stand of the present embodiment.

More specifically, as shown in FIGS. 3A and 3B, the stand 70 includes a vertical portion 71 (corresponding to a fastening portion) and a curved portion 72 (corresponding to a curved portion). The vertical portion 71 extends generally vertically and has an upper end fixed to the front end portion of the engine 40. The curved portion 72 extends from a lower end of the vertical portion 71 and makes a gentle curve to extend generally rearward and downward (toward a rear end portion of the engine 40). The upper end of the vertical portion 71 is formed with a pair of stand fastening portions 73 each on left and right ends. Each stand fastening portion 73 has a general cylindrical shape. A mounting hole 74 is formed in each stand fastening portion 73 to penetrate therethrough in the vertical direction. The fuel tank 60 is also formed with a pair of through-holes (not shown) at positions corresponding to the mounting holes 74 of the stand 70. A bolt (not shown) is inserted into each mounting hole 74 of the stand 70 and then into each through-hole of the fuel tank 60 from below for screw-fixing the stand 70 to the engine 40. Thus, the stand 70 is screw-fixed to the engine 40 via the fuel tank 60 by two bolts each penetrating through each mounting hole 74 and its corresponding through-hole of the fuel tank 60 (see FIG. 2). Put another way, the stand 70 is fixed to the engine 40 and the fuel tank 60 such that the stand fastening portions 73 are in contact with the fuel tank 60. The stand fastening portions 73 are thus screw-fixed to the front end portion of the engine 40 from below (from a downstream side of the engine 40 in the second direction). In other words, the stand 70 is thus fixed to the engine 40 (front end portion of the engine 40) only at the stand fastening portions 73. As a variation, the stand 70 may be screw-fixed only to the fuel tank 60, but not to the engine 40.

The curved portion 72 has a lower surface that serves as a stand contact surface 75 configured to make contact with the ground when the brush cutter 10 is placed on the ground.

Figure 8A:
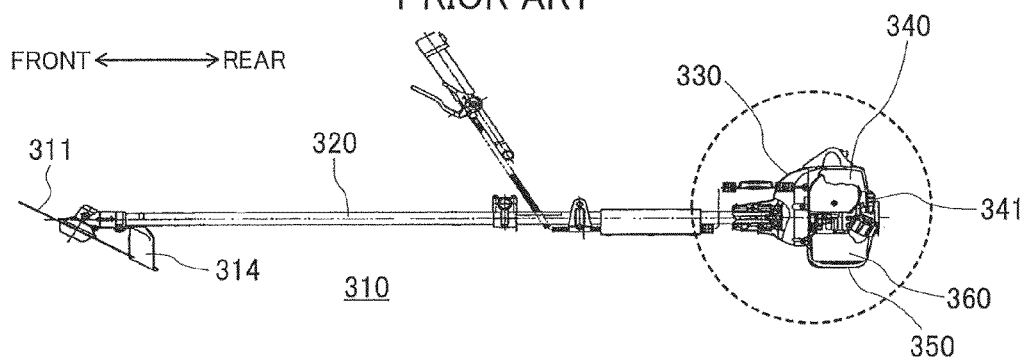
FIG. 8A is a side view of a conventional brush cutter provided with a protection cover.
Figure 8B:
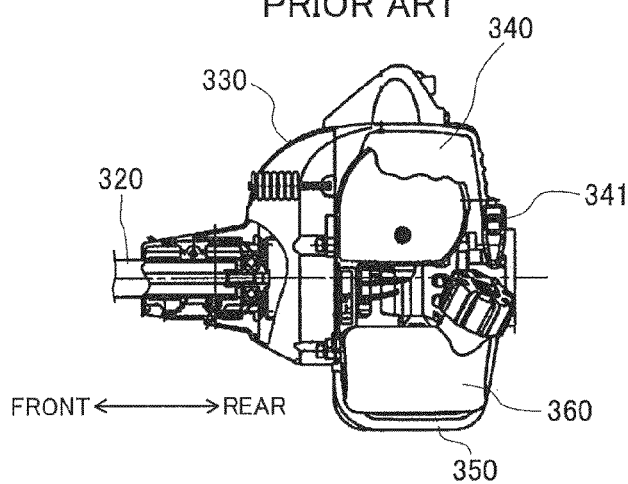
FIG. 8B is an enlarged view of a drive section of the conventional brush cutter shown in FIG. 8A.

In this stand 70, the curved portion 72 (stand contact surface 75) is in contact with the ground when the brush cutter 10 is placed on the ground. The stand 70 of the present embodiment has a total volume smaller than (possibly less than a half of) that of the conventional protective cover (stand) 350 shown in FIGS. 8A and 8B. Accordingly, the stand 70 can be lightweight.

Next, descriptions are given on deformation of the stand 70 upon receipt of load, and impact load applied to the stand 70 when the brush cutter 10 is dropped.

Specifically, deformation of the stand 70 upon application of load and the impact load acting on the stand 70 when the brush cutter 10 is dropped can be calculated based on a simplified assumption: both magnitudes of the deformation and impact load are dependent on a horizontal length X of the curved portion 72 in the front-rear direction (shown in FIG. 3A); and the stand 70 has a cantilevered structure.

Referring to FIG. 3B, the curved portion 72 has a second moment of area "I", which is represented by the following expression (1):

$$I = \frac{b \cdot t^3}{12} \quad (1)$$

where "b" represents a width of the curved portion 72 and "t" represents a thickness of the curved portion 72.

Using this second moment of area I, a distal end of the curved portion 72 is assumed to displace in the vertical direction by an amount δ (deformation amount δ of the stand 70 or stand deformation amount δ) as calculated by the following expression (2):

$$\delta = \frac{W \cdot X^3}{3 \cdot E \cdot I} = \frac{4 \cdot W \cdot X^3}{E \cdot b \cdot t^3} \quad (2)$$

where "W" represents a load that acts on the stand 70 and "E" represents a longitudinal elasticity modulus of the stand 70.

That is, the stand deformation amount δ is proportional to the cube of the horizontal length X of the curved portion 72.

On the other hand, an impact load Fi that acts on the stand 70 when the brush cutter 10 is dropped from a height h can be given by the following expression (3):

$$Fi = \sqrt{2 \cdot M \cdot g \cdot K \cdot h} \quad (3)$$

where "g" represents a gravity acceleration and "K" represents a spring constant of the stand 70.

Here, the spring constant K is given by the following expression (4).

$$K = W/\delta = \frac{E \cdot b \cdot t^3}{4 \cdot X^3} \quad (4)$$

Figure 4:
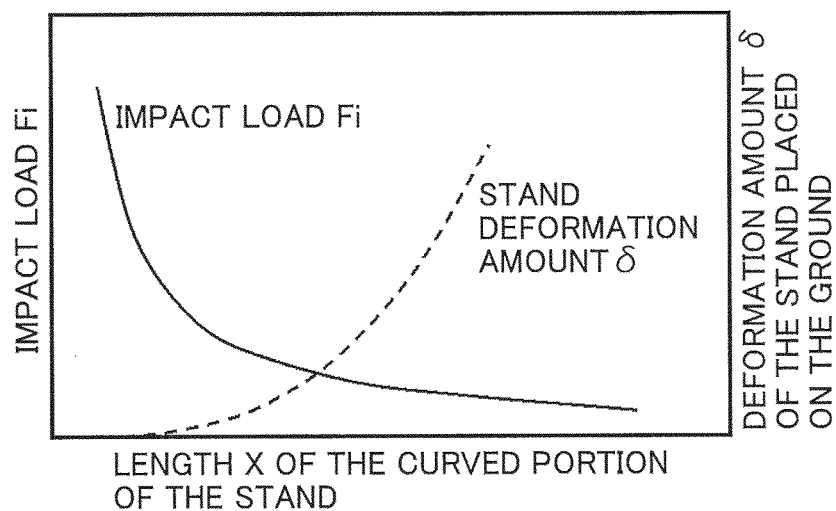
FIG. 4 is a graph illustrating how impact load Fi and stand deformation amount δ depend on a horizontal length X of a curved portion of the stand according to the embodiment.

From these expressions (1) to (4), it can be calculated that the impact load Fi is proportional to the horizontal length X of the curved portion 72 raised to the (−3/2)th power. Accordingly, how the stand deformation amount δ and impact load Fi depend on the horizontal length X is illustrated in FIG. 4. Here, it is desirable that both of the "δ" and "Fi" are small. The "Fi" can be made sufficiently small by making the "X" somewhat larger. On the other hand, the dependency of the stand deformation amount δ on the horizontal length X is large, so that the "δ" increases as the "X" increases. However, the "δ" need not be brought close to zero, as long as "δ<G" is satisfied (the stand deformation amount δ is smaller than the gap G) as described earlier. Thus, by appropriately selecting a material of the stand 70 and by appropriately determining dimensions "b" and "t" of the stand 70, the distal end of the stand 70 can be positioned near the lowermost end portion of the fuel tank 60 in the front-rear direction.

As described above and illustrated in FIGS. 3A and 3B, the stand 70 of the present embodiment is screw-fixed to the engine 40 from below only at the front end portion thereof by the bolts through the two mounting holes 74, while the stand 70 is not screw-fixed at the rear end portion of the engine 40. This means that only two bolts are required to fix the stand 70 to the engine 40, resulting in reduced weight of the drive section 30 provided at the rear end portion of the shaft 20. On the other hand, in the conventional brush cutter 310 shown in FIG. 8B, the protective cover (stand) 350 is screw-fixed by bolts at both of the front and rear end portions of the engine 340. As a result, in this conventional brush cutter 310, the rear end portion of the shaft 20 becomes heavier, and thus the operator may need to endure a heavy burden while operating the brush cutter 310. Compared to such conventional protective cover (stand) 350, the stand 70 of the present embodiment can realize a lighter weight at the rear end portion of the brush cutter 10, thereby contributing to reduction in the operator's burden during operation of the shaft 20.

Further, the fuel tank 60 of the present embodiment is formed of a translucent material so that the operator can visually confirm a fuel level (oil level) from outside. Furthermore, since the stand 70 of the present embodiment does not cover the rear half of the fuel tank 60, the operator can visually confirm the fuel inside the fuel tank 60 more easily. Compared to the stand 70 of the embodiment, the conventional protective cover (stand) 350 shown in FIGS. 8A and 8B covers a wider area of the fuel tank 360, which hinders the operator's visual confirmation of the fuel level in the fuel tank 360.

Figure 8C:
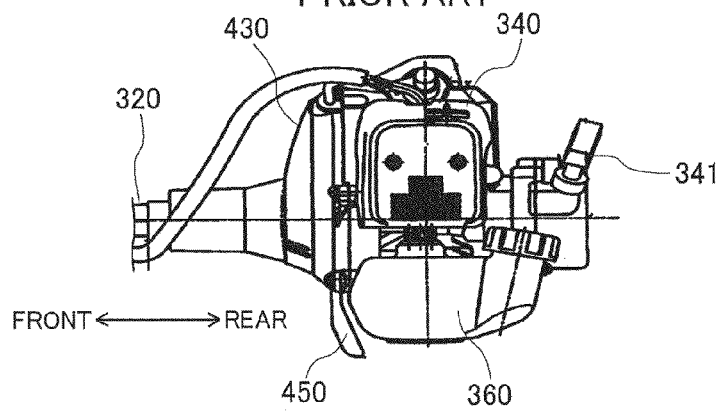
FIG. 8C is an enlarged view of the drive section of the conventional brush cutter provided with a conventional stand in place of the protection cover.

Incidentally, the simple-structured conventional stand 450 of FIG. 8C may realize weight reduction as a whole. However, in case of the conventional stand 450, only the distal end portion (lowermost portion) of the stand 450 may collide against the ground when the brush cutter 310 falls on the ground. Since the distal end portion of the stand 450, which has a small volume, would need to absorb the impact at the time of collision of the stand 450 with the ground, impact resistance (drop impact resistance) of the stand 450 would be degraded. Further, obviously, the stand 450 can provide poor protective performance over the fuel tank 360. On the other hand, the stand 70 of the present embodiment can be brought into contact with the ground with the stand contact surface 75 (i.e., at the entire lower surface around the rear end portion of the curved portion 72). That is, the stand 70 of the present embodiment can be in contact with the ground with a wider area than in the stand 450, thereby achieving an improved impact resistance. The stand 70 can also provide an enhanced protective performance over the fuel tank 60 than the stand 450.

As described above, the stand 70 used in the brush cutter 10 of the present embodiment is configured to cover only the front half portion of the fuel tank 60 and is thus smaller in size and light in weight, while providing sufficient supporting strength when the brush cutter 10 is placed on the ground.

Various modifications and variations are conceivable.

Figure 5A:
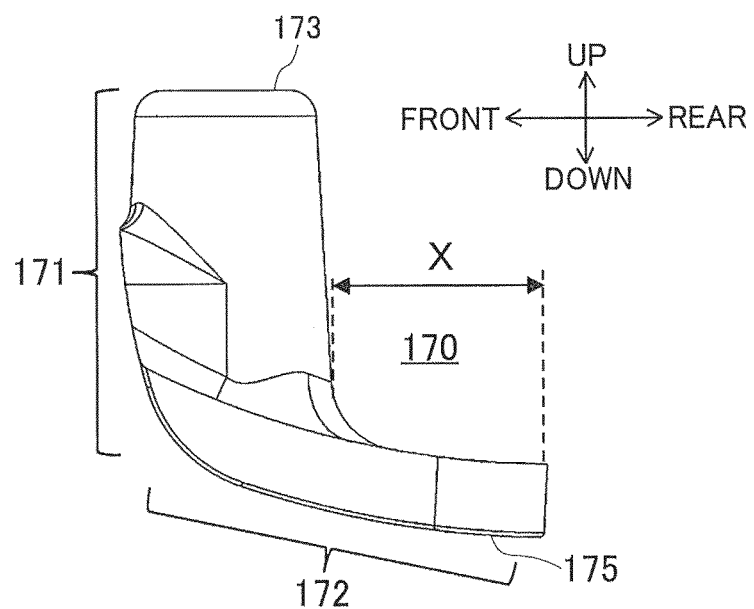
FIG. 5A is a side view of a stand according to a first modification to the embodiment of the present invention.
Figure 5B:
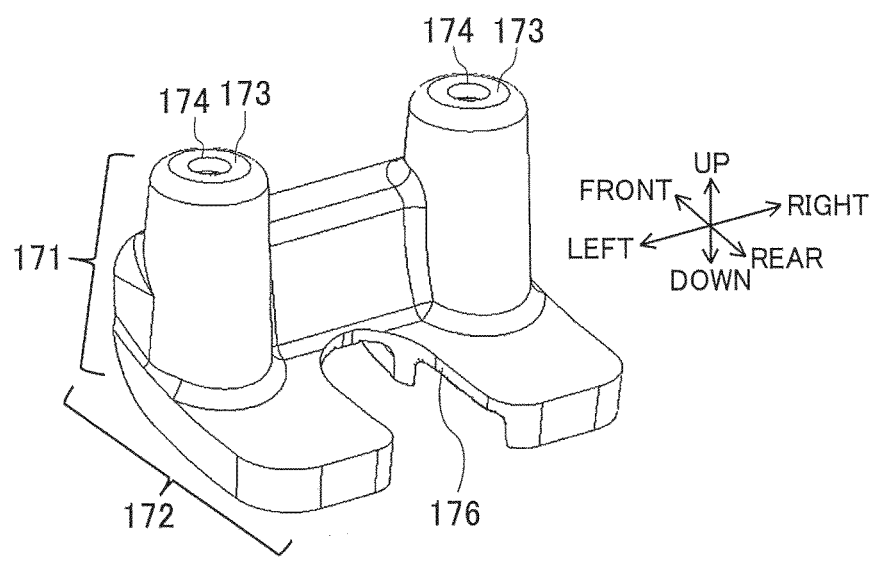
FIG. 5B is a perspective view of the stand according to the first modification.

FIGS. 5A and 5B illustrate a stand 170 according to a first modification to the depicted embodiment of the present invention. Just like the stand 70, the stand 170 of the first modification includes a vertical portion 171, a curved portion 172, a pair of stand fastening portions 173, a pair of mounting holes 174, and a stand contact surface 175. However, as illustrated in FIGS. 5B, the curved portion 172 has a rear end portion in which a cutout portion is formed. This cutout portion is labelled as a cutout portion 176 in FIG. 4B. Specifically, the cutout portion 176 is recessed frontward from a generally left-right center of the rear end portion of the curved portion 172. Or the cutout portion 176 is recessed from the distal end of the curved portion 172 in a direction opposite to the first direction. Forming the cutout portion 176 in the curved portion 172 realizes reduction in an entire volume of the stand 170, without significantly reducing mechanical strength, thereby further contributing to reduction in the weight of the stand 170.

Figure 6A:
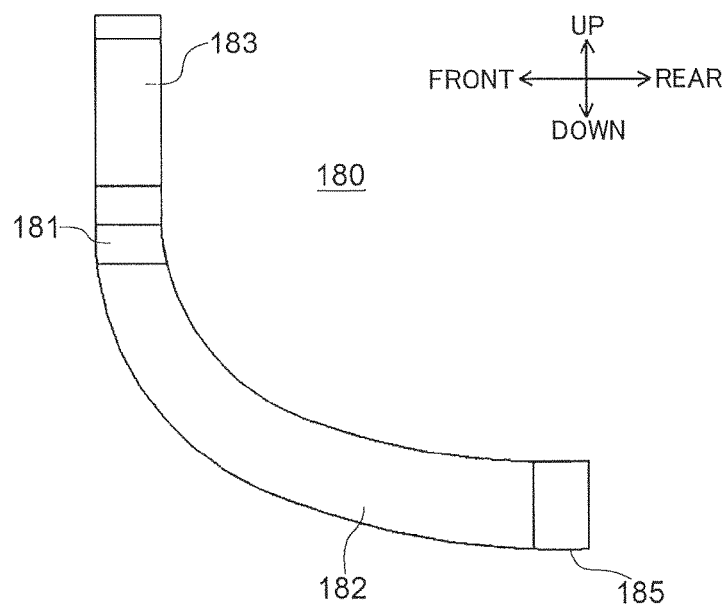
FIG. 6A is a side view of a stand according to a second modification to the embodiment of the present invention.
Figure 6B:
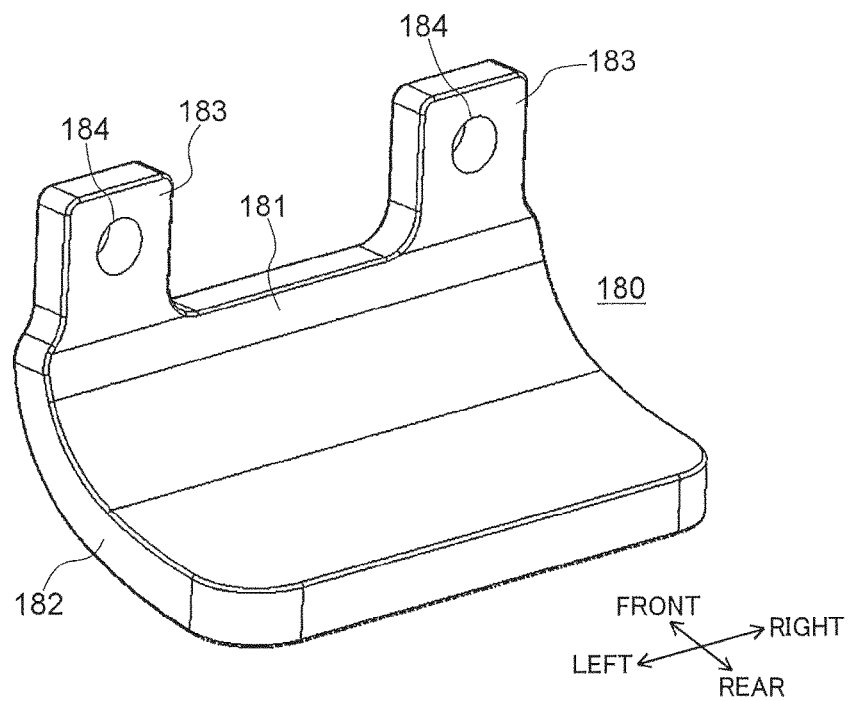
FIG. 6B is a perspective view of the stand according to the second modification.

FIGS. 6A and 6B illustrate a stand 180 according to a second modification to the embodiment of the present invention. Just like the stand 70, the stand 180 includes a vertical portion 181, a curved portion 182, and a stand contact surface 185. However, the stand 180 of the second modification includes a pair of stand fastening portions 183 having a generally flat plate-like shape. The stand fastening portions 183 are formed on an upper endface of the vertical portion 181 to protrude upward from left and right end portions of the vertical portion 181 respectively. Each stand fastening portion 183 is formed with a mounting hole 184 to penetrate therethrough in the front-rear direction, unlike the mounting hole 74, 174 penetrating each stand fastening portion 73, 173 in the vertical direction. Thus, the stand 180 is fixed to the engine 40 from its front side by two bolts each penetrating the corresponding mounting hole 184 in the front-rear direction. The stand fastening portions 183 are thus screw-fixed to the front end portion of the engine 40 from frontward (from an upstream side of the engine 40 in the first direction). In this case as well, the stand 180 is fixed to the front end portion of the engine 40 only via the stand fastening portions 183.

The stand 180 is formed by bending (curving) a flat plate. This simple-structured stand 180 serves to reduction in the weight of the brush cutter 10 as a whole.

Figure 7A:
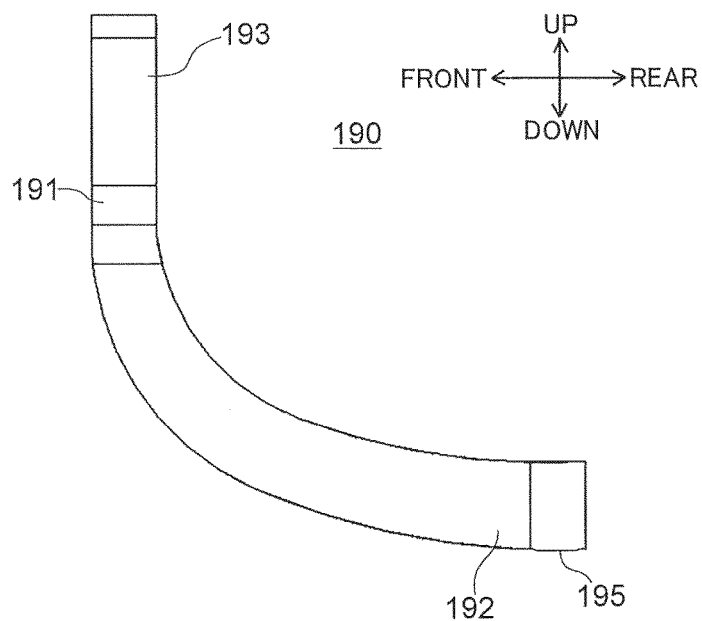
FIG. 7A is a side view of a stand according to a third modification to the embodiment of the present invention.
Figure 7B:
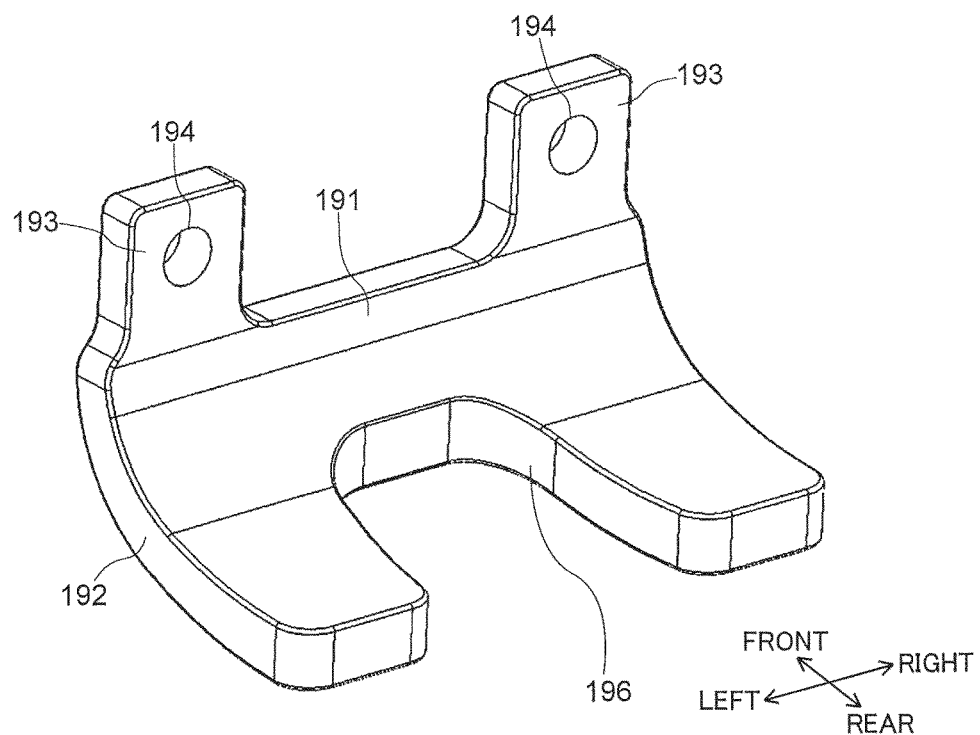
FIG. 7B is a perspective view of the stand according to the third modification.

FIGS. 7A and 7B illustrate a stand 190 according to a third modification to the embodiment of the present invention. The stand 190 has a generally similar configuration to that of the stand 180 of the second modification. Specifically, the stand 190 includes a vertical portion 191, a curved portion 192, a pair of stand fastening portions 193, a pair of mounting holes 194, and a stand contact surface 195.

The stand 190 of the third modification is different from the stand 180 of the second modification in that the stand 190 is further formed with a cutout portion 196 in generally left-right center of the curved portion 192. Just like the cutout portion 176, the cutout portion 180 is recessed frontward (in the direction opposite to the first direction) from the rear end portion (distal end) of the curved portion 192. This formation of the cutout portion 196 in the curved portion 192 can lead to reduction in the weight of the brush cutter 10 as a whole, and in particular reduction in the weight of the stand 190.

A similar stand may be applicable to other types of brush cutters each including a shaft, an engine, and a fuel tank, provided that such stand includes a curved portion and fastening portions similar to the curved portion 72, 172, 182, 192 and stand fastening portions 73, 173, 183, 193. Such stand can also realize the same technical effects as those of the present invention.

In the depicted embodiment and modifications, the brush cutter 10 is employed as an example of an engine-powered work tool of the present invention. However, the present invention may also be applicable to other types of engine-powered work tools each provided with a shaft, an engine and a fuel tank.

While the invention has been described in detail with reference to the above-described embodiments thereof, it would be apparent to those skilled in the art that various changes and modifications may be made therein without departing from the scope of the invention.

What is claimed is:

1. An engine-powered work tool comprising:
    a shaft extending in a first direction and having a rear end portion and a front end portion opposite to each other in the first direction, the first direction being defined as a direction from the front end portion toward the rear end portion;
    an engine provided at the rear end portion of the shaft and configured to generate a drive force, the drive force being configured to be transmitted from the engine toward the front end portion of the shaft, the engine having a front end portion and a rear end portion opposite to each other in the first direction;
    a fuel tank configured to store fuel to be supplied to the engine and disposed below the engine in a second direction perpendicular to the first direction, the second direction being defined as a direction from the engine to the fuel tank, the fuel tank having a rear end portion positioned most downstream in the fuel tank in the first direction and a bottom end portion positioned most downstream in the fuel tank in the second direction; and a stand fixed to the engine and extending toward downstream in the second direction to have a lower end portion positioned downstream of the bottom end portion of the fuel tank in the second direction, the stand comprising:

a fastening portion fixed to the front end portion of the engine; and a curved portion extending from the fastening portion and curving toward the rear end portion of the engine, the curved portion providing the lower end portion, the lower end portion having a distal end positioned upstream of the rear end portion of the fuel tank in the first direction, the distal end and the bottom end of the fuel tank defining a gap therebetween in the second direction.

2. The engine-powered work tool as claimed in claim 1, wherein the stand is also fixed to the fuel tank.

3. The engine-powered work tool as claimed in claim 1, wherein the stand is fixed to the engine only at the fastening portion.

4. The engine-powered work tool as claimed in claim 3, wherein the fastening portion is fixed to the front end potion of the engine from a downstream side thereof in the second direction.

5. The engine-powered work tool as claimed in claim 3, wherein the fastening portion is fixed to the front end potion of the engine from an upstream side thereof in the first direction.

6. The engine-powered work tool as claimed in claim 1, wherein the curved portion includes a cutout portion recessed from the distal end in a direction opposite to the first direction.

7. The engine-powered work tool as claimed in claim 1, wherein the fuel tank is made of a material that permits the fuel to be visually confirmed from outside.

8. The engine-powered work tool as claimed in claim 1, further comprising a rotary blade provided at the front end portion of the shaft and configured to rotate upon receipt of the drive force from the engine to constitute a brush cutter.

9. The engine-powered work tool as claimed in claim 2, wherein the stand is fixed to the engine only at the fastening portion.

10. The engine-powered work tool as claimed in claim 9, wherein the fastening portion is fixed to the front end potion of the engine from a downstream side thereof in the second direction.

11. The engine-powered work tool as claimed in claim 9, wherein the fastening portion is fixed to the front end potion of the engine from an upstream side thereof in the first direction.

* * * * *